(12) United States Patent
Klessig et al.

(10) Patent No.: US 8,085,790 B2
(45) Date of Patent: Dec. 27, 2011

(54) ETHERNET LAYER 2 PROTOCOL PACKET SWITCHING

(75) Inventors: Robert W. Klessig, Los Altos Hills, CA (US); Vijayakumar Raghavendran, Cary, NC (US); Muralidhara R. Basavaraju, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 1187 days.

(21) Appl. No.: 11/551,183

(22) Filed: Oct. 19, 2006

(65) Prior Publication Data

US 2008/0013547 A1 Jan. 17, 2008

Related U.S. Application Data

(60) Provisional application No. 60/807,430, filed on Jul. 14, 2006.

(51) Int. Cl.
*H04L 12/56* (2006.01)

(52) U.S. Cl. .......................... 370/398; 370/401

(58) Field of Classification Search .................... None
See application file for complete search history.

(56) References Cited

U.S. PATENT DOCUMENTS

| | | | |
|---|---|---|---|
| 6,216,167 B1 | 4/2001 | Momirov | |
| 6,789,121 B2 | 9/2004 | Lamberton | |
| 6,952,421 B1 | 10/2005 | Slater | |
| 7,092,389 B2 * | 8/2006 | Chase et al. | 370/389 |
| 7,136,374 B1 * | 11/2006 | Kompella | 370/352 |
| 7,385,973 B1 * | 6/2008 | Johnson et al. | 370/389 |
| 7,492,763 B1 * | 2/2009 | Alexander, Jr. | 370/389 |
| 2002/0007412 A1 | 1/2002 | Paridaens et al. | |
| 2002/0089992 A1 * | 7/2002 | Yip et al. | 370/401 |
| 2002/0110148 A1 * | 8/2002 | Hickman et al. | 370/475 |
| 2003/0123448 A1 * | 7/2003 | Chang | 370/395.1 |
| 2004/0081180 A1 * | 4/2004 | De Silva et al. | 370/402 |
| 2004/0103282 A1 | 5/2004 | Meier | |
| 2005/0063397 A1 | 3/2005 | Wu et al. | |
| 2005/0174943 A1 * | 8/2005 | Wang | 370/235 |
| 2005/0190757 A1 | 9/2005 | Sajassi | |
| 2005/0249124 A1 * | 11/2005 | Elie-Dit-Cosaque et al. | 370/242 |
| 2006/0098681 A1 | 5/2006 | Cafiero | |
| 2006/0101140 A1 | 5/2006 | Gai | |
| 2006/0245435 A1 * | 11/2006 | Sajassi | 370/395.53 |
| 2006/0245439 A1 * | 11/2006 | Sajassi | 370/400 |
| 2007/0002850 A1 * | 1/2007 | Guichard et al. | 370/389 |
| 2007/0110028 A1 * | 5/2007 | Wu | 370/352 |

(Continued)

FOREIGN PATENT DOCUMENTS

CN 1777150 5/2006

(Continued)

OTHER PUBLICATIONS

USPTO; PCT Serial No. PCT/US07/60775; PCT Search Report—ISA/US; Sep. 3, 2007; 2 Pages.

(Continued)

*Primary Examiner* — Chirag G Shah
*Assistant Examiner* — Joshua Smith
(74) *Attorney, Agent, or Firm* — Stolowitz Ford Cowger LLP (57) ABSTRACT

In one embodiment, an apparatus includes an access node, and the access node includes ports. The access node is operable to perform downlink switching based upon a unique Provider Virtual Local Area Network tag (S-TAG) and a unique IEEE 802.1Q tag header (C-TAG) that is assigned to each port.

17 Claims, 6 Drawing Sheets

U.S. PATENT DOCUMENTS

2007/0153799 A1* 7/2007 Sorrini et al. .............. 370/395.1
2009/0003221 A1* 1/2009 Burns et al. ................... 370/241

FOREIGN PATENT DOCUMENTS

WO        2008008556        1/2008

OTHER PUBLICATIONS

USPTO; PCT Serial No. PCT/US07/60775; PCT International Preliminary Report on Patentability and Written Opinion—ISA/US; Jan. 14, 2009; 8 Pages.

Cisco Systems, Inc., "Configuring Frame Relay and Frame Relay Traffic Shaping," Cisco IOS Quality of Service Solutions Configuration Guide, http://www.cisco.com/univercd/cc/td/doc/product/software/ios121/121cgcr/qos_c/qcprt4/qcdfrts.pdf, Oct. 18, 2006, pp. QC155-168.

Stolowitz Ford Cowger LLP; Related Case listing; Jul. 21, 2010; 1 Page.

English Abstract of CN1777150; Retrieved from European Patent Office website, http://www.epo.org; Jul. 11, 2011; 1 Page.

* cited by examiner

ETHERNET LAYER 2 PROTOCOL PACKET SWITCHING

CROSS-REFERENCE TO RELATED APPLICATIONS

This application claims priority from U.S. provisional patent application 60/807,430, which was filed on 14 Jul. 2006. U.S. provisional patent application 60/807,430 is incorporated by reference in its entirety.

TECHNICAL FIELD

This disclosure relates generally to digital computer network technology, and more particularly, improved Ethernet services.

BACKGROUND

Packet-switched describes the type of network in which relatively small units of data called packets are routed through a network based on the destination address contained within each packet. Breaking communication down into packets allows the same data path to be shared among many users in the network. This type of communication between sender and receiver is known as connectionless (rather than dedicated). Most traffic over the Internet uses packet switching and the Internet is basically a connectionless network.

DESCRIPTION OF EXAMPLE EMBODIMENTS

1. Overview

A method according to an example embodiment of the invention includes assigning a Provider Virtual Local Area Network tag (S-TAG) and an IEEE 802.1Q tag header (C-TAG) to a group of ports to implement a N:1 Virtual Local Area Network (VLAN) allocation scheme, the group of ports included in an access node that communicatively connects a Customer Edge (CE) device to a Provider Edge (PE) device. The method further includes receiving a frame from the CE device, the frame containing a Layer 2 (L2) protocol packet, and switching the frame based upon the S-TAG and the C-TAG.

An apparatus according to an example embodiment of the invention includes an access node, the access node including ports, the access node operable to perform downlink switching based upon a unique Provider Virtual Local Area Network tag (S-TAG) and a unique IEEE 802.1Q tag header (C-TAG) that is assigned to each port.

According to another example embodiment of the invention, logic may be encoded in one or more tangible media for execution and when executed may be operable to insert a tag into a frame that is transmitted from a Customer Edge (CE) device, the tag including a Provider Virtual Local Area Network tag (S-TAG) and a IEEE 802.1Q tag header (C-TAG), and perform downlink switching based upon the S-TAG and the C-TAG.

2. Example Embodiments

A Media Access Control (MAC) address is the unique hexadecimal serial number assigned to an Ethernet network device to identify it on the network. With Ethernet devices, this address can be permanently set at the time of manufacture or configured during installation. Each network device has at least one unique MAC address, so that it will be able to receive only the frames that were sent to it. If MAC addresses were not unique, there would be no way to distinguish between two stations.

Devices on a network monitor network traffic and search for their own MAC address in each frame to determine whether they should decode it or not. Special circumstances exist for broadcasting to every device on the network. Although some types of network devices, such as Network Interface Cards (NICs), typically have a single MAC address, other types of network devices, such as routers, bridges, and switches, may have multiple MAC addresses. Network devices with multiple MAC addresses typically have a MAC address for each port on the network device.

Ethernet uses variable-length frames of data to transmit information from a source to one or more destinations. Every Ethernet frame has two fields defined as the source and destination addresses, which indicate the MAC address of the network devices where a frame originated and the MAC address of the network device where the frame is destined, respectively.

Ethernet Layer 2 (L2) switching allows frames to be switched in the network based on their MAC address. When a frame arrives at the switch, the switch checks the frame's destination MAC address and, if known, sends the frame to the output port from which it learned the destination MAC.

Two important elements in Ethernet L2 switching are the MAC address and the Virtual Local Area Network (VLAN). In the same way that Internet Protocol (IP) routing references stations on the networks via a Layer 3 (L3) IP address, Ethernet L2 switching references end stations via the MAC address. However, unlike IP, in which IP addresses are assigned by administrators and can be reused in different private networks, MAC addresses are supposed to be globally unique, because they are indicative of the hardware itself. Thus, MAC addresses are generally not assigned by the network administrator. In some cases the MAC addresses can be overwritten or duplicated, but this is not the norm.

Ethernet is a broadcast medium. Without the concept of VLANs, a broadcast sent by a station on the Local Area Network (LAN) is sent to all physical segments of the switched LAN. The VLAN concept allows the segmentation of the LAN into logical entities, and traffic is localized within those logical entities. For example, a university campus may be allocated multiple VLANs-one dedicated for faculty, one dedicated for students, and the third dedicated for visitors. Broadcast traffic within each of these VLANs is isolated to that VLAN.

Figure 1A:
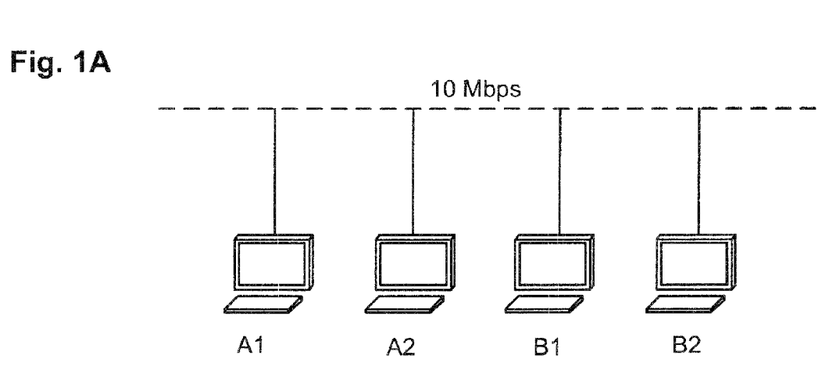
FIG. 1A is a diagram illustrative of an Ethernet LAN using a hub.
Figure 1B:
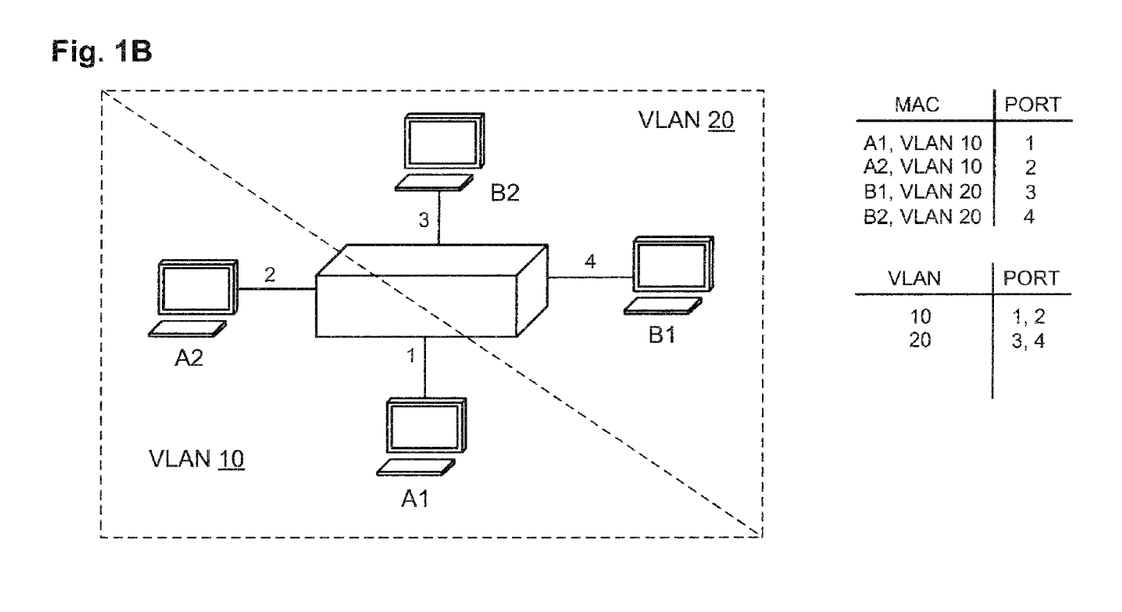
FIG. 1B is a diagram illustrative of an Ethernet LAN using an Ethernet switch.

FIG. 1A is a diagram illustrative of an Ethernet LAN using a hub, while FIG. 1B is a diagram illustrative of an Ethernet LAN using an Ethernet switch.

With the Ethernet hub of FIG. 1A, all stations A1, A2, B1, B2 on the LAN share the same physical segment. A 10-Mbps hub, for example, allows broadcast and unicast traffic between the stations that share the 10-Mbps bandwidth.

On the other hand, the Ethernet switch of FIG. 1B allows, for example, each segment a 100-Mbps connection, and it segments the LAN into two logical domains, VLAN 10 and VLAN 20.

The concept of VLANs is independent of the stations themselves. The VLAN is an allocation by the switch. In FIG. 1B, ports 1 and 2 are allocated to VLAN 10, while ports 3 and 4 are allocated to VLAN 20. When stations A1 and A2 send traffic, the switch tags the traffic with the VLAN assigned to the interface and makes the switching decisions based on that VLAN number. The result is that traffic within a VLAN is isolated from traffic within other VLANs.

MAC learning allows the Ethernet switch to learn the MAC addresses of the stations in the network to identify on which port to send the traffic. LAN switches normally keep a MAC learning table (or a bridge table) and a VLAN table.

The MAC learning table associates the MACs/VLANs with a given port, and the VLAN table associates the port with a VLAN. A MAC learning table and a VLAN table that are associated with the Ethernet switch of FIG. 1B appear at the right side of FIG. 1B. The MAC learning table and the VLAN table show that the Ethernet switch has learned the MAC addresses of stations A1, A2, B1, and B2 on ports 1, 2, 4, and 3, respectively. It also shows that ports 1 and 2 are associated with VLAN 10 and ports 3 and 4 are associated with VLAN 20.

IEEE 802.1Q, which is incorporated by reference, defines how an Ethernet frame gets tagged with a VLAN ID. The VLAN ID may be assigned by the switch and not the end station. In this case, the switch assigns a VLAN number to a port, and every frame received on that port gets allocated that VLAN ID. The Ethernet switches switch frames between the same VLANs. Traffic between different VLANs is sent to a routing function within the switch itself (if the switch supports L3 forwarding) or an external router.

Figure 2A:
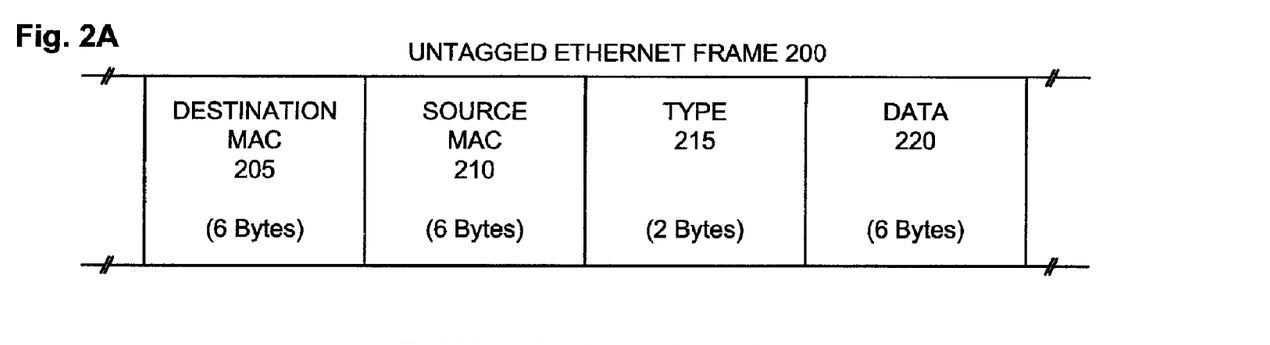
FIG. 2A is a diagram illustrating how VLAN tags are inserted inside an untagged Ethernet frame to create a tagged Ethernet frame in accordance with IEEE 802.1Q.

FIG. 2A is a diagram illustrating how VLAN tags are inserted inside an untagged Ethernet frame 200 to create a tagged Ethernet frame 250 in accordance with IEEE 802.1Q.

Referring to FIG. 2A, the untagged Ethernet frame 200 includes a destination MAC address 205, a source MAC address 210, a Type field 215, and the data 220.

To create the tagged Ethernet frame 250, an 802.1Q tag header 225 is inserted between the source MAC address 210 and the Type field 215. The 802.1Q tag header 225 consists of a 2-byte Type field 225a and a 2-byte Tag Control Info (TCI) field 225b.

The Type field 225a is set to 0X8100 to indicate an 802.1Q tagged frame. The 3 leftmost bits of TCI field 225b indicates the priority in accordance with IEEE 802.1Q, which is incorporated by reference. The 802.1Q priority field may specify up to eight different priority levels that can be used to offer different levels of service within the network. The 12 rightmost bits of TCI field 225b constitute the VLAN ID field, which allows the assignment of up to 4096 ($2^{12}$) VLAN numbers to distinguish the different VLAN tagged frames.

Some Ethernet applications, such as Metro Ethernet, require extensions to L2 switching. An example is the ability to do VLAN stacking—that is, to do multiple VLAN tagging to the same Ethernet frame, creating a stack of VLAN IDs. Different entities can then do L2 switching on the different levels of the VLAN stack. This concept of VLAN stacking may conveniently be referred to as "Q-in-Q", which is short for "IEEE 802.1Q in IEEE 802.1Q."

Figure 2B:
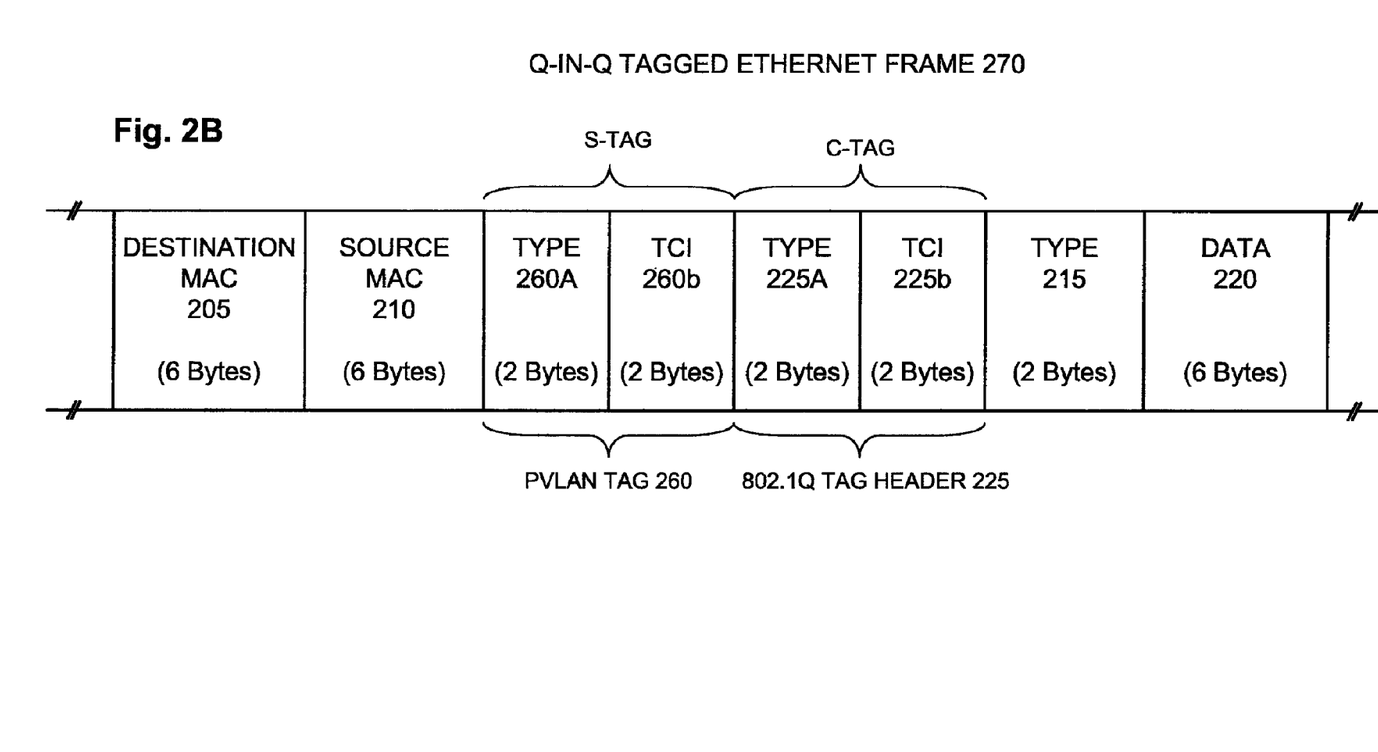
FIG. 2B is a diagram illustrating a Q-in-Q tagged Ethernet frame.

FIG. 2B is a diagram illustrating a conventional Q-in-Q tagged Ethernet frame 270. When compared to the tagged Ethernet frame 250 of FIG. 2A, it can be seen that the Q-in-Q Ethernet frame 270 includes an additional Provider VLAN (PVLAN) tag 260 that is inserted between the source MAC address 210 and the 802.1Q tag header 225.

Like the 802.1Q tag header 225, the PVLAN tag 260 consists of a 2-byte Type field 260a and a 2-byte TCI field 260b.

For convenience, the 802.1Q tag header 225 may be referred to as a C-TAG, and the PVLAN tag 260 may be referred to as an S-TAG.

Figure 3:
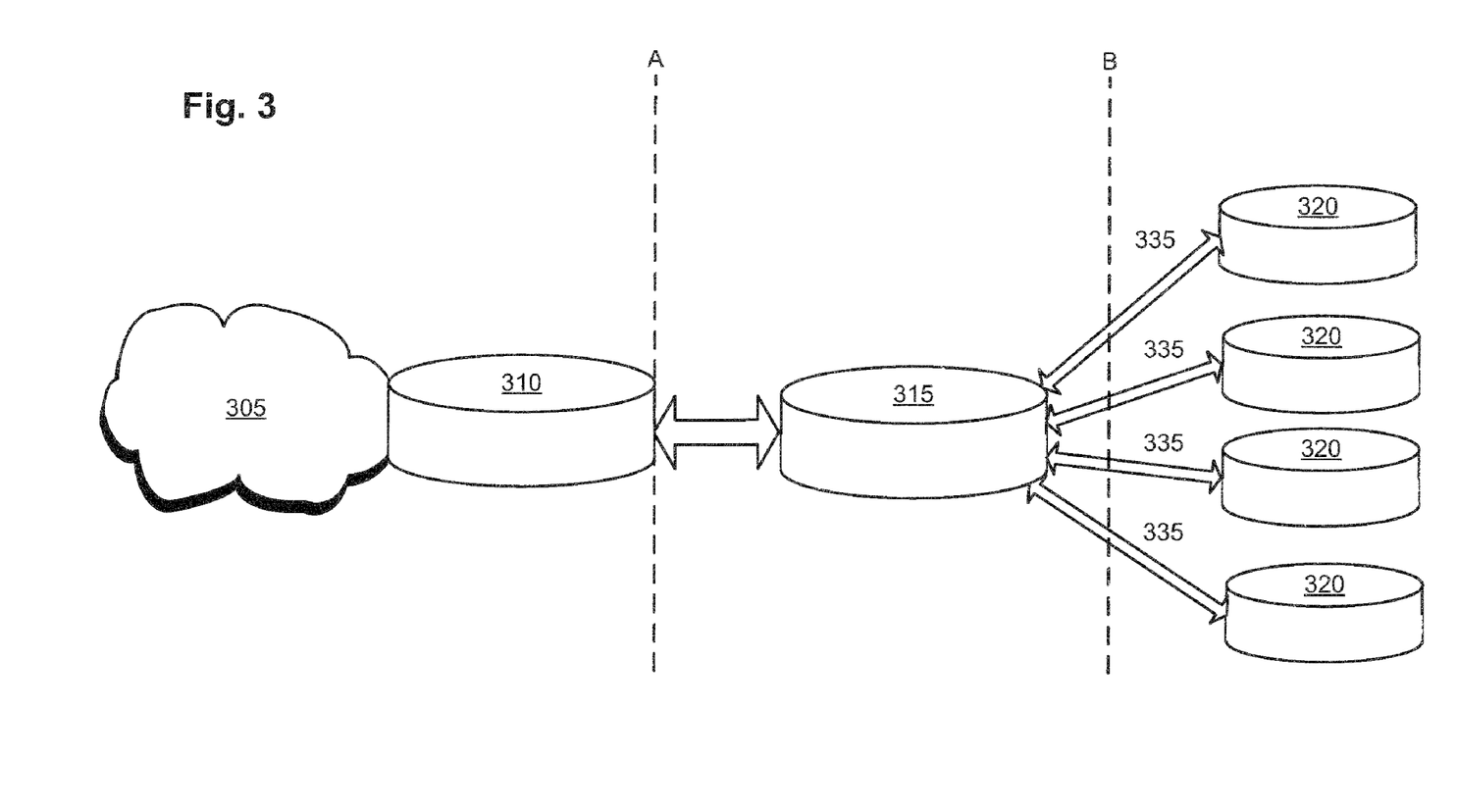
FIG. 3 is a diagram illustrating a network suitable for use with embodiments of the invention.

FIG. 3 is a diagram illustrating an example network 300 that is suitable for use with embodiments of the invention.

Referring to FIG. 3, the network 300 includes a Service Provider (SP) network 305, which may be, for example, a Metro Ethernet Network (MEN). A MEN is a computer network based on the Ethernet standard that covers a metropolitan area.

The network 300 further includes at least one Provider Equipment (PE) device 310 at the edge of the SP network 305, which is communicatively connected to an access node 315 by an Ethernet uplink 325. The access node 315 may be, for example, a Digital Subscriber Line Access Multiplexer (DSLAM). Other networks suitable for use with embodiments of the invention may include more than one access node 315, each of which is communicatively connected to a corresponding PE 310 by its own Ethernet uplink 325.

The network 300 also includes a number of Customer Edge (CE) devices 320 that are each communicatively connected to the access node 315 by a link 335. Each of the links 335 may use any transport technology, i.e., Frame Relay, Asynchronous Transfer Mode (ATM), Ethernet VLAN, etc.

Thus, each of the CEs 320 is communicatively connected to the PE 310 by its corresponding link 335, the access node 315, and the Ethernet uplink 325, which collectively may be referred to as a Virtual User Network Interface (VUNI). It is desirable for the access node 315 to maintain the Virtual UNI for each of the CEs 320.

In the region between interface A and interface B, which may also be referred to as an aggregation network, a L2 protocol is typically operative. Ethernet Local Management Interface (E-LMI) is one example of such a protocol. The E-LMI protocol allows configuration and status information for the services at a UNI of a MEN to be transferred from the MEN to a CE device coupled to the MEN at the UNI. Further details regarding the E-LMI protocol may be found in U.S. patent application Ser. No. 10/811,458, which was filed on 26 Mar. 2004, and is hereby incorporated by reference.

Figure 4:
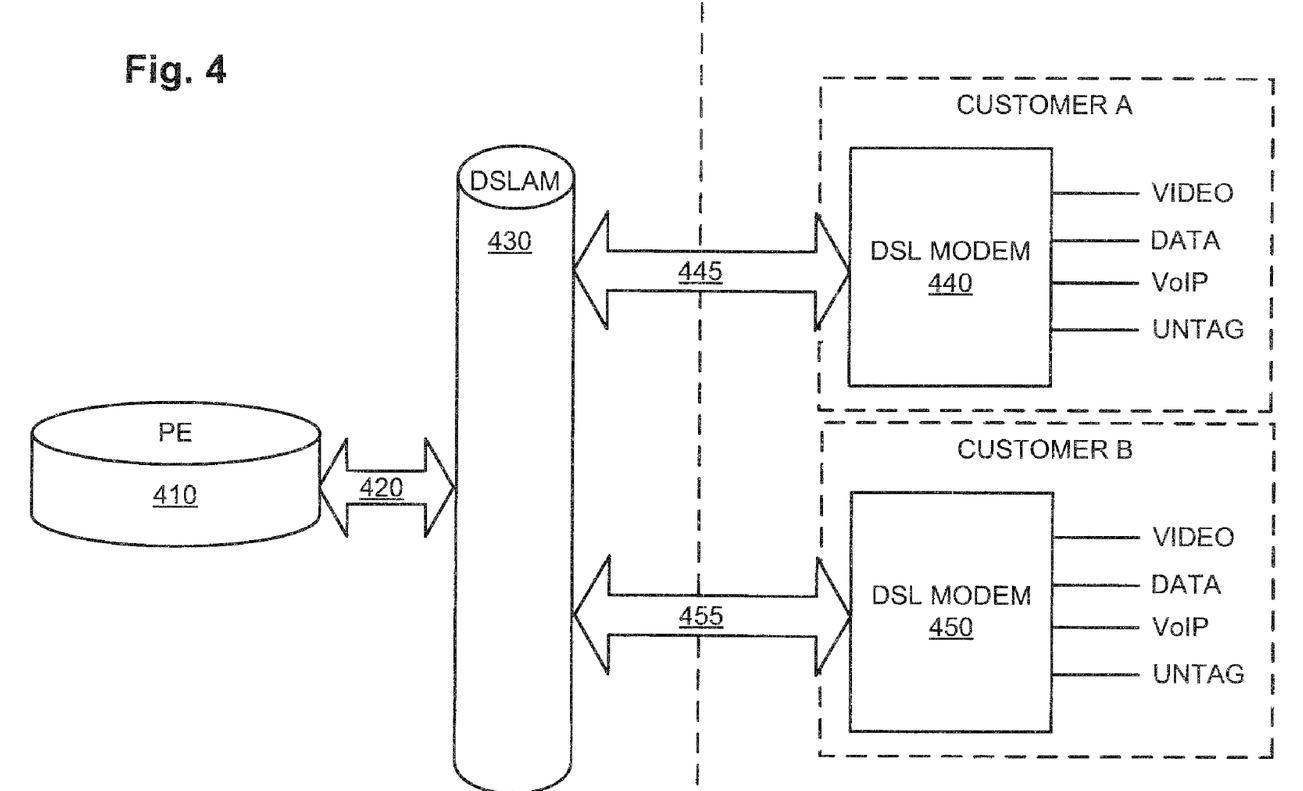
FIG. 4 is a diagram illustrating a network portion that is suitable for use with embodiments of the invention.

FIG. 4 is a diagram illustrating an example network portion 400 that is suitable for use with embodiments of the invention.

Referring to FIG. 4, the network portion 400 includes a PE device 410 that is communicatively connected to a DSLAM 430 by an Ethernet uplink 420. The DSLAM 430 is communicatively connected to DSL modems 440 and 450 by links 445 and 455. The DSL modems 440, 450 are considered CE devices, with DSL modem 440 belonging to Customer A and DSL modem 450 belonging to Customer B. Like the PE 310 in FIG. 3, the PE 410 is the gateway to a SP network (not shown), which may be a MEN.

As illustrated in FIG. 4, the DSL modems 440, 450 may transmit and receive frames representing video, data, Voice over Internet Protocol (VoIP), as well as untagged frames. It is a goal of many SPs to offer varying classes of service depending on the type of frame. As one example, when congestion is present in a network, it might be desirable to give priority to a customer's VoIP frames at the expense of data frames. This differentiation between VoIP, data, and video in order to provide preferential treatment to specific types of frames may be referred to as "triple play."

Similar to the situation described above in FIG. 3, the Ethernet uplink 420, the DSLAM 430, and the links 445, 455 constitute a Virtual UNI for each of the customers A, B. Not only is it desirable to maintain the Virtual UNI between the CE and the PE for each of the customers, but it is also desirable to offer different classes of service such as triple play as described above. These dual purposes may be accomplished using at least two broad classes of VLAN allocation paradigms.

According to the first class of VLAN allocation paradigm, a unique VLAN identification is assigned to a port of the DSLAM 430 using either a unique S-TAG or a unique S-TAG, C-TAG pair. The uniqueness of the S-TAG should be maintained in the aggregation network. This paradigm may be denoted 1:1 VLAN to indicate a one-to-one mapping between port and VLAN.

Tables 1A and 1B, which appear below, illustrate a conventional method of implementing a 1:1 VLAN scheme. When referring to Tables 1A and 1B, as well as the other Tables that follow in this specification, it is helpful to continually refer to FIG. 4.

Table 1A is illustrative of an example 1:1 VLAN scheme that may be used to identify both a customer and a type of data frame for purpose of providing classes of service, such as triple play. In this VLAN scheme, DSLAM 430 receives different types of frames from Customers A and B. DSLAM 430 inserts an S-TAG into the frame to uniquely identify the port or customer, and also inserts a C-TAG to identify the type of frame. The frames are then sent on to the PE 410.

As shown in Table 1A, an S-TAG value of 101 is associated with Customer A, and C-TAG values of 10 and 11 are used to represent VoIP frames or Data frames, respectively. If the frames from Customers A and B are untagged, then the DSLAM will not insert a C-TAG.

Table 1B is illustrative of the Customer Look-Up Table that is kept by the DSLAM 430 for the 1:1 VLAN scheme described in Table 1A. Downlink frames received from the PE 410 are switched according to Table 1B. As shown in Table 1B, the DSLAM 430 knows the exact destination or port (Customer A or Customer B) for each of the received frames based upon the S-TAG value.

TABLE 1A

| S-TAG | C-TAG | origin; frame type |
| --- | --- | --- |
| 101 | 10 | Customer A; VoIP |
| 101 | 11 | Customer A; Data |
| 101 | Untag | Customer A; Untagged |
| 102 | 10 | Customer B; VoIP |
| 102 | 11 | Customer B; Data |
| 102 | Untag | Customer B; Untag |

TABLE 1B

| S-TAG | destination |
| --- | --- |
| 101 | Customer A |
| 102 | Customer B |

Table 2A is illustrative of another example 1:1 VLAN scheme that may be used to identify both a customer and a type of data frame for purpose of providing classes of service, such as triple play. In this VLAN scheme, DSLAM 430 receives different types of frames from Customers A and B. In this scheme, DSLAM 430 inserts both an S-TAG and a C-TAG into the frame, similar to the scheme described in Table 1A. In this scheme, however, the S-TAG is used to identify the type of frame, and the C-TAG is used to identify the port or customer.

As shown in Table 2A, C-TAG values of 10 and 11 are associated with Customers A and B, respectively, while S-TAG values of 101, 102, and 104 are used to represent VoIP frames, data frames, and untagged frames, respectively.

Table 2B is illustrative of the Service Look-Up Table that is kept by the DSLAM 430 for the 1:1 VLAN scheme described in Table 2A. As shown in Table 2B, the DSLAM 430 knows the exact type of frame for each frame received from the PE 410 based upon the S-TAG value. The DSLAM 430 also knows the exact destination or port (Customer A or Customer B) for each of the received frames based upon the C-TAG value as specified in Table 2A.

TABLE 2A

| S-TAG | C-TAG | origin; frame type |
| --- | --- | --- |
| 101 | 10 | Customer A; VoIP |
| 101 | 11 | Customer B; VoIP |
| 102 | 10 | Customer A; data |
| 102 | 11 | Customer B; data |
| 104 | 10 | Customer A; untagged |
| 104 | 11 | Customer B; untagged |

TABLE 2B

| S-TAG | frame type |
| --- | --- |
| 101 | VoIP |
| 102 | Data |
| 104 | Untagged |

According to the second class of VLAN allocation paradigm, the same S-TAG or S-TAG, C-TAG pair is assigned to a group of ports on the DSLAM 430. This paradigm may be denoted N:1 VLAN to indicate a many-to-one mapping between ports and VLAN. Example criteria for grouping of the ports may be the same originating Virtual Private Network (VPN), the same service, the same "destination" Service Provider (SP), etc.

Table 3A is illustrative of an example N:1 VLAN scheme that may be used to identify a type of data frame for purpose of providing classes of service, such as triple play. In this VLAN scheme, DSLAM 430 receives different types of frames from Customers A and B. In this scheme, DSLAM 430 inserts an S-TAG to identify the type of frame. S-TAG values of 101, 102, and 104 are used to represent VoIP frames, data frames, and untagged frames, respectively.

However, as is typical with networks operating this sort of N:1 VLAN scheme, the DSLAM 430 ignores the C-TAG and will not insert a C-TAG into an untagged frame in an effort to reduce usage of the VLAN space.

TABLE 3A

| S-TAG | C-TAG | Origin, frame type |
| --- | --- | --- |
| 101 | Don't Care (DC) | Customer A; VoIP |
| 101 | DC | Customer B; VoIP |
| 102 | DC | Customer A; data |

TABLE 3A-continued

| S-TAG | C-TAG | Origin, frame type |
|-------|-------|--------------------|
| 102 | DC | Customer B; data |
| 104 | DC | Customer A; untagged |
| 104 | DC | Customer B; untagged |

TABLE 3B

| S-TAG | frame type |
|-------|-----------|
| 101 | VoIP |
| 102 | Data |
| 104 | Untagged |

When downlink frames are subsequently received from the PE 410 for delivery to the appropriate customer, the DSLAM 430 is able to determine the type of frame based upon the S-TAG value, as illustrated in Table 3B.

Since the C-TAG values are ignored in this N:1 VLAN scheme, the DSLAM 430 must perform downlink switching based upon some other field. This is usually performed using the destination MAC address 205, which forms part of untagged Ethernet frames, tagged Ethernet frames in accordance with IEEE 802.1Q, and Q-in-Q tagged Ethernet frames as illustrated in FIGS. 2A and 2B.

As was explained above, a L2 control protocol such as E-LMI is typically running on the aggregation network between the CE and the PE. The presence of a L2 control protocol, such as E-LMI, on the aggregation network may cause problems because downlink switching is typically based upon the destination MAC address 205. For example, an E-LMI frame uses a standard MultiCAST (MCAST) address as the destination MAC address 205, making it impossible to switch downlink frames to the appropriate customer using the destination MAC address. This problem may exist with other L2 protocols as well.

To solve the problem described above, when operating in a N:1 VLAN regime the DSLAM 430 should operate in a similar manner as was described for the 1:1 VLAN scheme. Thus, according to example embodiments of the invention, the DSLAM 430 may use a unique S-TAG to forward the L2 protocol frames to the PE 410.

Further according to example embodiments of the invention, the DSLAM may assign a unique value to each port and indicate it to the PE 410 as a C-TAG frame within the L2 protocol frame.

Figure 5:
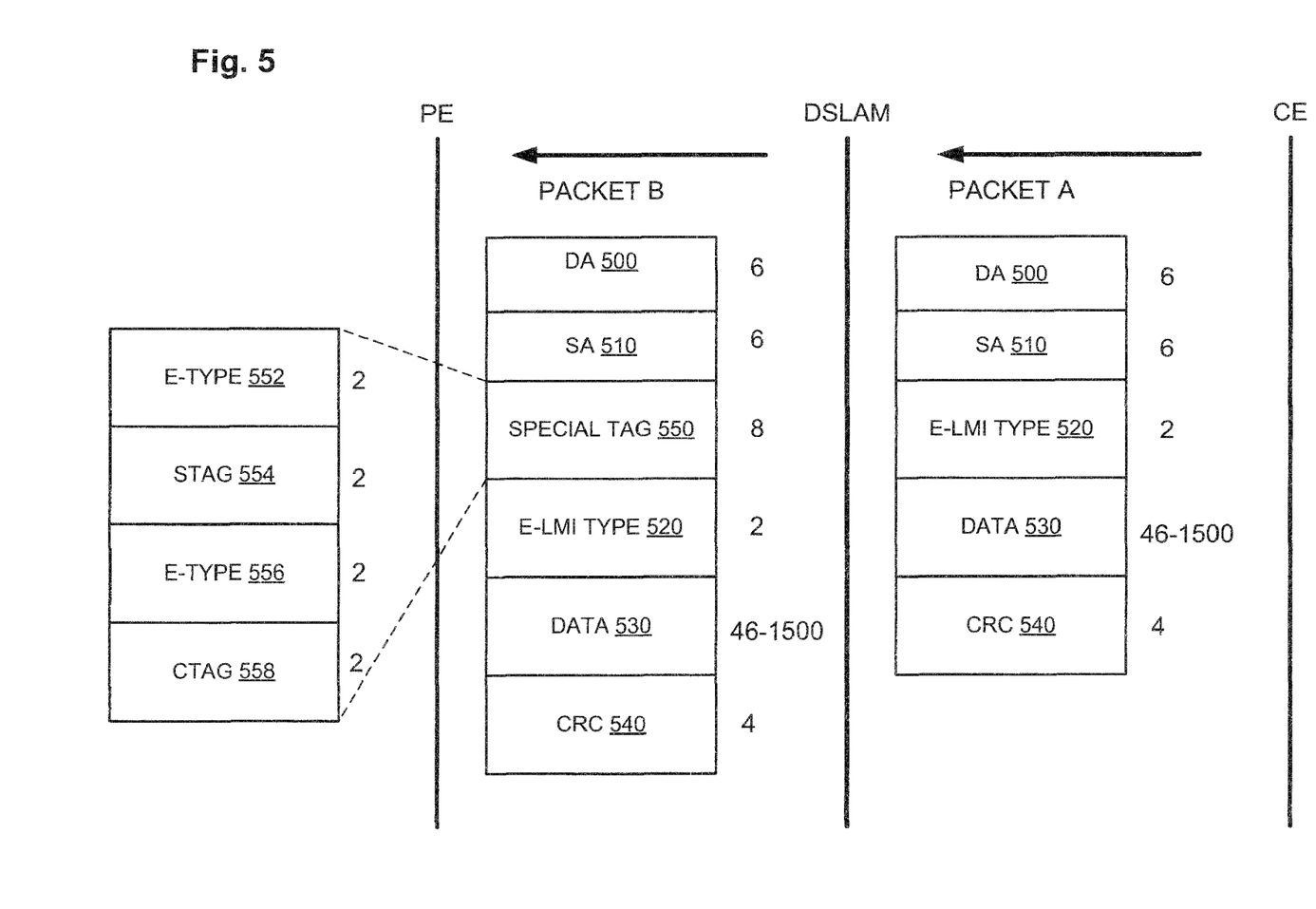
FIG. 5 is a diagram illustrating a method of implementing an N:1 VLAN scheme according to some embodiments of the invention.

FIG. 5 is a diagram illustrating an example method of implementing a N:1 VLAN scheme in accordance with some embodiments of the invention. FIG. 5 illustrates an untagged E-LMI frame A sent from the CE to the DSLAM, as well as a tagged E-LMI frame B sent from the DSLAM to the PE.

As shown in FIG. 5, the DSLAM inserts a special tag 550 into frame A to produce frame B, which is otherwise the same as frame A. The special tag 550 consists of an Ethertype (Etype) field 552, a S-TAG 554, another Etype field 556, and a C-TAG 558, each of which is two bytes long.

The portions of Frame A and Frame B that are common to both of the frames include a Destination MAC Address (DA) field 500, a Source MAC Address (SA) field 510, an E-LMI Type field 520, a Data field 530, and a Cyclic Redundancy Check (CRC) field 540. The size in bytes of each of these fields 500, 510, 520, 530, 540 is shown to the left of the field.

The N:1 VLAN scheme described above and illustrated in FIG. 5 is similar to the 1:1 VLAN example described above in Table 2A, which also uses a unique S-TAG and C-TAG, but does not perform downlink switching based upon the C-TAG. In this case, the DSLAM uses a unique S-TAG to tunnel the E-LMI packets to the PE, and additionally assigns a unique value to each port and sends it to the PE as a C-TAG frame. Thus, downlink switching is performed in this N:1 VLAN scheme based on the special tag 550, and not based on the destination MAC address as in standard E-LMI.

According to other example embodiments of the invention, N:1 VLAN schemes similar to the embodiment described above may be implemented with other L2 protocols that may be running on the aggregation network. The other L2 protocols may include Cisco Discovery Protocol (CDP), UniDirectional Link Detection (UDLD), Port Aggregation Protocol (PAgP), Port Based Network Access Control (IEEE 802.1X), and Link Aggregation Control Protocol (LACP). In these instances, similar to the embodiments described above that use E-LMI as the L2 protocol in the aggregation network, the DSLAM uses a unique S-TAG to tunnel the L2 protocol packets to the PE, and additionally assigns a unique value to each port and sends it to the PE as a C-TAG frame within the L2 protocol packet.

One of skill in the art will recognize that the concepts taught herein can be tailored to a particular application in many other advantageous ways. In particular, those skilled in the art will recognize that the illustrated embodiments are but examples of many alternative implementations that will become apparent upon reading this disclosure.

The preceding embodiments are examples. Although the specification may refer to "an", "one", "another", or "some" embodiment(s) in several locations, this does not necessarily mean that each such reference is to the same embodiment(s), or that the feature only applies to a single embodiment.

The invention claimed is:

1. A method comprising:
   assigning, with a networking device, a unique Provider Virtual Local Area Network tag (S-TAG) to a group of ports and a different unique IEEE 802.1Q tag header (C-TAG) to each port in the group of ports to implement a N:1 Virtual Local Area Network (VLAN) allocation scheme, wherein the S-TAG is configured to identify a type of VLAN frame that is associated with the group of ports, wherein the group of ports are included in the networking device that communicatively connects a Customer Edge (CE) device to a Provider Edge (PE) device;
   receiving, with the networking device, a frame from the PE device, the frame including the S-TAG assigned to the group of ports and a C-TAG assigned to a particular port in the group of ports; and
   forwarding, with the networking device, the frame from the particular port to the CE device based upon both the S-TAG and the C-TAG in the frame.

2. The method of claim 1, further comprises:
   receiving a frame from the CE device, wherein the frame from the CE device is configured to include Layer 2 (L2) protocol packet;
   inserting a tag into the frame from the CE device, the tag including the S-TAG and a different C-TAG; and
   forwarding the L2 protocol packet to the PE device based on the S-TAG.

3. The method of claim 2, wherein the L2 protocol packet comprises an Ethernet Local Management Interface (E-LMI) packet.

4. The method of claim 2, wherein the L2 protocol packet comprises one selected from the group consisting of a Cisco Discovery Protocol (CDP) packet, a UniDirectional Link Detection (UDLD) packet, a Port Aggregation Protocol (PAgP) packet, a Port Based Network Access Control (IEEE 802.1X) packet, and a Link Aggregation Control Protocol (LACP) packet.

5. The method of claim 1, wherein the networking device comprises a Digital Subscriber Line Access Multiplexer (DSLAM).

6. An apparatus comprising:
an access node coupled between a customer edge (CE) device and a provider edge (PE) device, the access node including ports to output frames towards the CE device and the PE device, the access node operable to receive a frame from the PE device and to forward the frame to the CE device based upon both a unique Provider Virtual Local Area Network tag (S-TAG) and a unique IEEE 802.1Q tag header (C-TAG), wherein the S-TAG is assigned to all of the ports and a different unique C-TAG is assigned to each port, and wherein the S-TAG is configured to identify a type of Virtual Local Area Network (VLAN) corresponding to the frame associated with the group of ports.

7. The apparatus of claim 6, the access node operable to insert one or more tags into a frame received from the CE device, the tags including the S-TAG and the C-TAG.

8. The apparatus of claim 7, the access node operable to communicate with the PE device located at the edge of a Service Provider (SP) network using an uplink.

9. The apparatus of claim 8, wherein the SP network comprises a Metro Ethernet Network (MEN).

10. The apparatus of claim 8, the access node comprising a Digital Subscriber Line Access Multiplexer (DSLAM), the DSLAM operable to forward a Layer 2 (L2) protocol packet to the PE device based upon the S-TAG.

11. The apparatus of claim 10, wherein the L2 protocol packet comprises an Ethernet Local Management Interface (E-LMI) packet.

12. Logic encoded in one or more tangible and non-transitory media for execution and when executed operable to:
insert a tag into a frame that is transmitted from a Customer Edge (CE) device, the tag including a Provider Virtual Local Area Network tag (S-TAG) that is unique to a group of ports and a IEEE 802.1Q tag header (C-TAG) that is unique to one of the ports in the group of ports, wherein the S-TAG is configured to identify a type of Virtual Local Area Network (VLAN) corresponding to the frame associated with the group of ports; and
perform downlink switching of frames to the CE device based upon both the S-TAG and the C-TAG in the frames.

13. The logic of claim 12, further comprises:
forwarding a Layer 2 (L2) protocol packet included in the frame to a Provider Edge (PE) device based upon the S-TAG.

14. The logic of claim 13, wherein the L2 protocol packet comprises an Ethernet Local Management Interface (E-LMI) packet.

15. The logic of claim 13, wherein the L2 protocol packet is selected from the group consisting of a Cisco Discovery Protocol (CDP) packet, a UniDirectional Link Detection (UDLD) packet, a Port Aggregation Protocol (PAgP) packet, a Port Based Network Access Control (IEEE 802.1X) packet, and a Link Aggregation Control Protocol (LACP) packet.

16. The logic of claim 12, wherein the tag comprises:
a first two-byte Ethertype (Etype) field disposed adjacent to the S-TAG; and
a second two-byte Etype field disposed immediately between the S-TAG and the C-TAG.

17. The logic of claim 12, when executed further operable to implement a N:1 Virtual Local Area Network (VLAN) allocation scheme.

* * * * *